(No Model.) 2 Sheets—Sheet 1.

J. T. ISH.
FRUIT GRADING MACHINE.

No. 458,422. Patented Aug. 25, 1891.

Witnesses
Geo. W. Breck.
Edward Thorpe.

Inventor
James T. Ish.
By his Attorneys
Fowler & Fowler (No Model.) 2 Sheets—Sheet 2.
J. T. ISH.
FRUIT GRADING MACHINE.
No. 458,422. Patented Aug. 25, 1891.
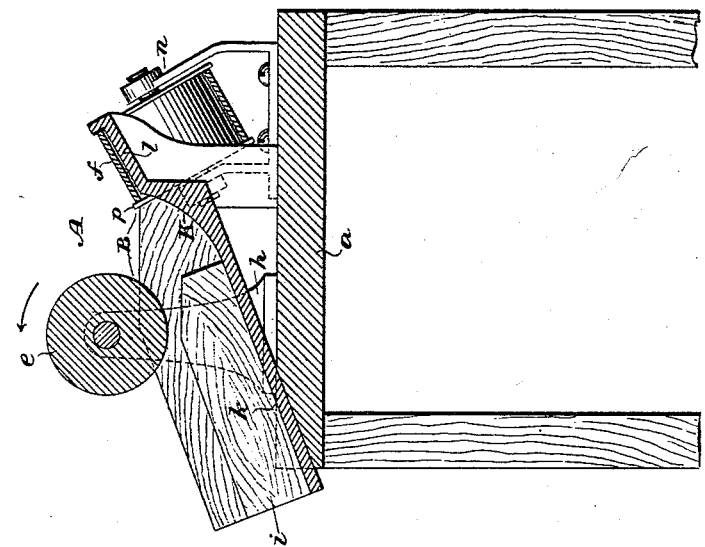
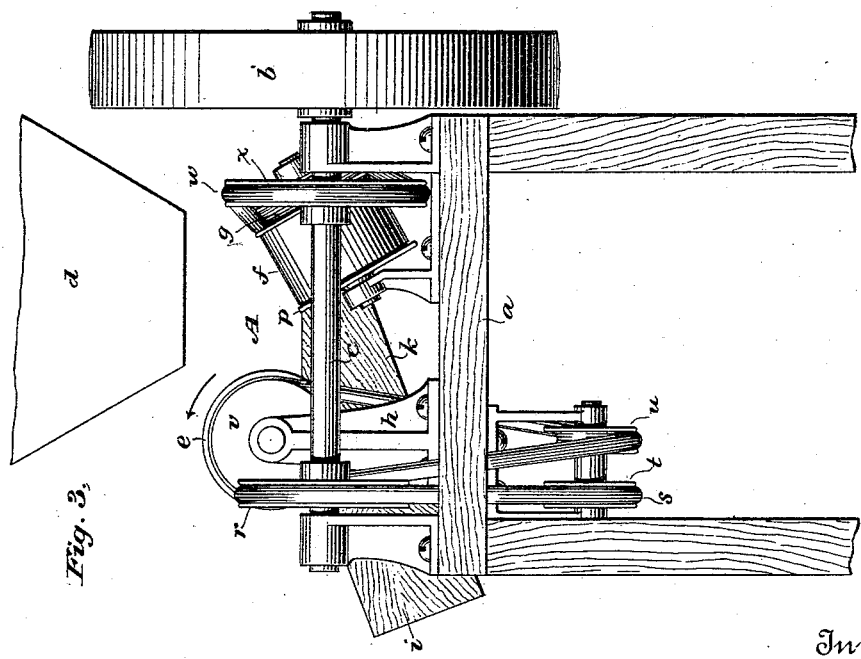
Witnesses
Geo. W. Breck
Edward Thorpe
Inventor
James T. Ish.
By his Attorneys
Fowler & Fowler
THE NORRIS PETERS CO., PHOTO-LITHO., WASHINGTON, D. C.

UNITED STATES PATENT OFFICE.

JAMES T. ISH, OF SAN FRANCISCO, CALIFORNIA, ASSIGNOR TO J. L. MOSHER, T. H. CHANDLER, AND J. B. ROBINSON, OF SAME PLACE.

FRUIT-GRADING MACHINE.

SPECIFICATION forming part of Letters Patent No. 458,422, dated August 25, 1891.

Application filed June 21, 1889. Serial No. 315,089. (No model.)

*To all whom it may concern:*

Be it known that I, JAMES T. ISH, a citizen of the United States, residing at San Francisco, county of San Francisco, and State of California, have invented certain new and useful Improvements in Fruit-Separators, of which the following is such a full, clear, and exact description as will enable any one skilled in the art to which it appertains to make and use the same, reference being had to the accompanying drawings, forming part of this specification.

My invention relates to a machine for separating or assorting fruit or vegetables according to size; and the invention consists in the certain novel and peculiar arrangements and combinations of the various parts of the machine, all as hereinafter fully described, and then pointed out in the claims.

Figure 1:
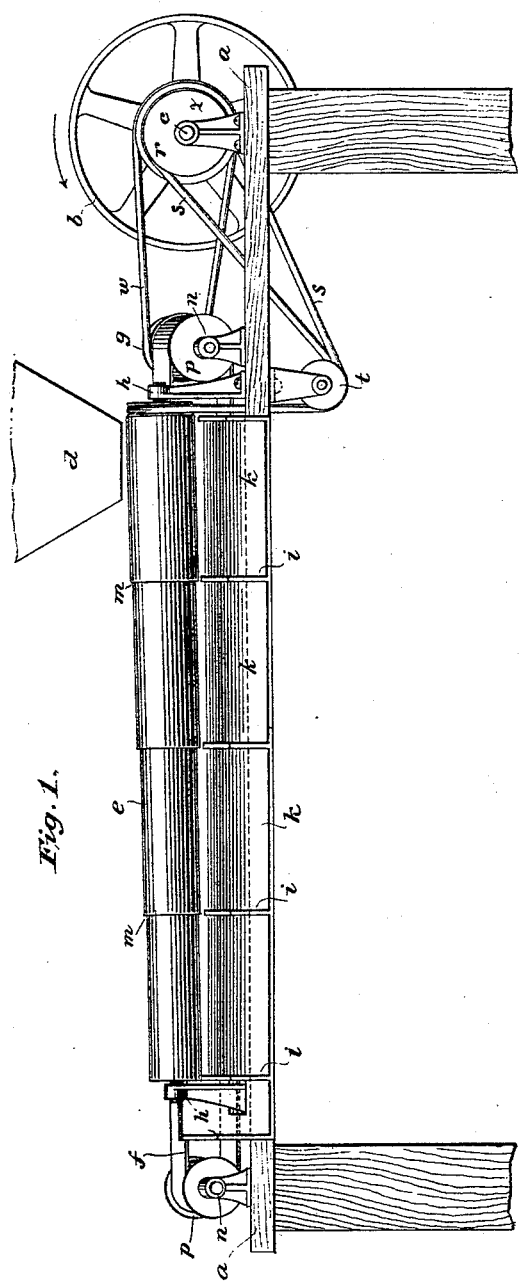
Figure 2:
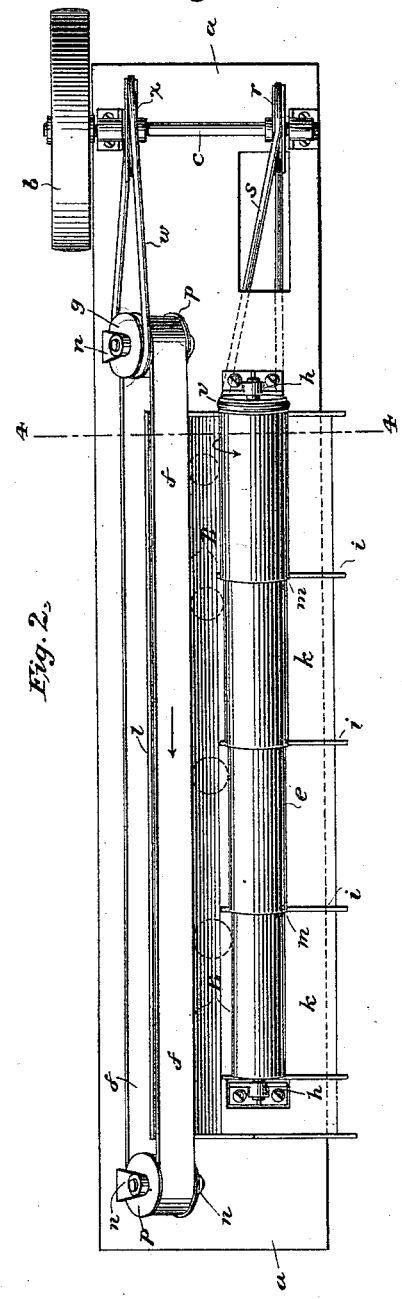

In the accompanying drawings, illustrating my invention, Figure 1 is a side view of the machine embodying my invention. Fig. 2 is a top plan view of Fig. 1 with the hopper omitted. Fig. 3 is an enlarged end view of the machine. Fig. 4 is an enlarged sectional view, the section being taken on a plane indicated by line 4 4 in Fig. 2.

In the said drawings like reference-letters designate like parts throughout.

Referring to the drawings, $e$ is a rotary member, consisting in a graduated cylindrical body or roller, which is mounted in suitable bearings $h\ h$, fixed upon the machine-frame. This roller is rotated in the direction of the adjacent arrows by means hereinafter described, and is slightly inclined to the horizontal in order to assist the passage of the fruit through the machine, and is stepped at $m\ m$, so that the roller is composed of cylindrical sections of different diameters, the diameters of the sections decreasing from the feed end to the delivery end thereof. The motion of the roller is obtained from the main shaft $c$ by means of the belt-wheel $r$, belt $s$, pulleys $t\ u$, and the pulley $v$ on the end of the roller, the shaft $c$ being driven by the band-wheel $b$. The other member $f$, which, together with the graduated roller $e$, forms the space or grading-chute through which the fruit is passed, consists in an endless belt mounted on the flanged pulleys $p\ p$, which are set obliquely and turn in bearings $n\ n$, secured upon the frame $a$. The pulley $n$ near the shaft $c$ is driven thereby through means of the grooved wheel $g$, belt $w$, and pulley $x$. When the roller is inclined, the belt $f$ is also inclined at the same angle, thereby forming an inclined grading-chute along which the fruit may gravitate. The belt rotates in an oblique plane and in such direction as to cause its upper or working section to travel from the upper toward the lower end of the grading-chute A, as per the arrow shown thereon, in order to assist the movement of the fruit through the machine. The belt $f$ is preferably placed so that the edge thereof adjacent the member $e$ is in a plane parallel to the axis of said member, as will be readily understood from the drawings.

Instead of a flat belt a rope or any suitable preferred conveying means may be used to move the fruit along the roller $e$. The outer surface of the belt may be provided in any suitable manner with means for increasing the friction between the belt and fruit to give the latter a more positive motion. A canvas of coarse texture would answer the purpose very well, though, if preferred, catch fingers or bars may be placed on the belt. This belt acts in a delicate manner upon the fruit when combined with the roller $e$, rotating as described, and it will be seen that the fruit is not liable to be bruised or injured thereby.

To prevent the belt $f$ from sagging, in order to maintain the graduated opening between the belt and the roller uniform, I provide the belt with a bed or support $l$, over which the upper or working portion of the belt travels, as will be understood from the drawings. If desired, this bed may be provided with anti-friction rollers to relieve the belt of the drag by lessening the friction between the same and the bed.

Beneath the members $e$ and $f$ is placed a delivery-chute $k$, which extends from one of said members downwardly and beneath the graduated space out under the other member, as will be understood from the drawings. The fruit in passing down from the graduated space passes into the chute from where it may be received in boxes or bags. This chute is provided at regular intervals with partitions or divisions $i$, so that like sizes of fruit may pass into its proper division and be collected. To prevent the fruit from being bumped, and thereby bruised as it passes through the graduated space between the members into the delivery-chute, I curve or incline the latter, as at K, Fig. 4. This curve is preferably struck from the center of the roller $e$, so that the curve is concentric therewith, and this permits the fruit to be gradually rolled or lowered into the chute in an obvious manner, thereby preventing bruising of the same.

The operation of the machine will now be evident. The fruit is fed into the grading-chute A, formed by the members $e$ and $f$, at the upper or right-hand end thereof by any suitable means—for instance, by the hopper $d$. The fruit then moves or is moved along between the members, and until it comes to a point where the width of the graduated space B corresponds to its diameter, when it passes down through the space into its proper division or chute. The dotted-in circles in the grading-way, Fig. 4, may be supposed to represent four pieces of fruit of different sizes that have reached their corresponding openings in the graduated space between the members $e$ and $f$, and are about to pass down through the same into the delivery-chutes. The positive motion of the belt $f$ will carry the fruit rapidly through the machine, the passage of which is also assisted by the rotary motion of the roller $e$. However, if preferred, gravity may be used to assist the movements of the fruit by inclining slightly the members $e$ and $f$, as indicated in the drawings, though this inclination may not be adopted, as it is in no wise essential to the operation of my invention.

Having thus described my improvements in fruit and vegetable separators, what I claim as my invention, and desire to secure by Letters Patent, is—

1. In a fruit-separator, a grading way or chute for the fruit to pass along and be separated or assorted, the same comprising a suitably-mounted member and a traveling belt arranged adjacent to said member, so as to form in conjunction therewith the way or chute for the fruit.

2. In a fruit-separator, a grading way or chute for the fruit to pass along and be separated or assorted, the same comprising a graduated member and an endless traveling belt arranged parallel and adjacent to the said member, so as to form in conjunction therewith the way or chute for the fruit.

3. In a fruit-separator, a grading way or chute for the fruit to pass along and be separated or assorted, the same comprising a graduated member and an endless traveling belt arranged near the said member, so as to form in conjunction therewith the way or chute, and provided with a support or bed for holding the working portion of the belt from sagging.

4. A fruit-separator comprising a graduated rotary member and a traveling endless belt arranged parallel and adjacent thereto.

5. A fruit-separator comprising two members arranged with a graduated space therebetween for the fruit to pass through and one or more delivery-chutes arranged beneath the said space between the members and formed with an inclined or curved bottom, the incline or curve of which extends from the working edge of one of the members downwardly, whereby the fruit passing through the space may be gradually rolled into the delivery-chute and prevented from falling or dropping therein.

6. A fruit-separator comprising two spaced members having a graduated space therebetween for the fruit to pass through, one of said members being cylindrical, one or more delivery-chutes arranged beneath the said space and formed with a curved bottom, the curve of which is concentric with that of the said cylindrical member and extends from the working edge of the said other member downwardly, whereby the fruit may roll into the delivery-chute.

7. A fruit-separator having, in combination, a rotary graduated roller $e$ and an endless traveling belt $f$, arranged parallel thereto, with the graduated space between them, substantially as set forth.

8. A fruit-separator having, in combination, a rotary graduated roller $e$, suitably mounted and driven from shaft $c$, and an endless belt $f$, mounted on inclined pulleys $p\ p$ and receiving its motion from shaft $c$, substantially as set forth.

9. A fruit-separator having, in combination, a rotary graduated roller $e$, suitably mounted and driven, and an endless belt $f$, provided with a belt or support $l$ for preventing the sagging of the belt, substantially as set forth.

10. A fruit-separator having, in combination, a pair of spaced members forming therebetween a graduated space for the fruit to pass through, one of said members being cylindrical, such as the roller $e$, and one or more delivery-chutes $k$, arranged beneath the said space and having the bottom thereof curved, as at K, and such curve extending from the working edge of the other said member downwardly, substantially as set forth.

In testimony whereof I have hereunto set my hand and affixed my seal, in the presence of two subscribing witnesses, this 31st day of May, 1889.

JAS. T. ISH. [L. S.]

Witnesses:
H. A. COBB,
JOS. F. NOUNNAN.